(12) United States Patent
Huang

(10) Patent No.: US 9,279,941 B1
(45) Date of Patent: Mar. 8, 2016

(54) OPTICAL WAVEGUIDE LENS

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/573,789

(22) Filed: Dec. 17, 2014

(30) Foreign Application Priority Data

Sep. 25, 2014 (TW) .............................. 103133183 A

(51) Int. Cl.
| | | |
|---|---|---|
| *G02B 6/34* | (2006.01) | |
| *G02B 6/26* | (2006.01) | |
| *G02B 6/42* | (2006.01) | |
| *G02B 6/27* | (2006.01) | |
| *G02B 6/125* | (2006.01) | |
| *G02B 6/126* | (2006.01) | |
| *G02B 6/14* | (2006.01) | |

(52) U.S. Cl.
CPC ................ *G02B 6/2726* (2013.01); *G02B 6/34* (2013.01); *G02B 6/125* (2013.01); *G02B 6/126* (2013.01); *G02B 6/14* (2013.01)

(58) Field of Classification Search
CPC .......... G02B 6/125; G02B 6/126; G02B 6/14; G02B 6/2726; G02B 6/34
USPC ................................................ 385/11, 37, 45
See application file for complete search history.

(56) References Cited

U.S. PATENT DOCUMENTS 5,436,992 A * 7/1995 Wang et al. ...................... 385/45
5,488,681 A * 1/1996 Deacon et al. ................... 385/37

* cited by examiner

*Primary Examiner* — Ryan Lepisto
(74) *Attorney, Agent, or Firm* — Novak Druce Connolly Bove + Quigg LLP

(57) ABSTRACT

An optical waveguide lens includes a base, a Y type waveguide, a polarized grating. The Y type waveguide has a first gate, a second gate and a third gate. The first gate is located on one edge of the base, the second gate and the third gate are located on an opposite edge of the base. The polarized grating is formed on the Y type waveguide and adjacent to the first gate of the Y type waveguide.

14 Claims, 5 Drawing Sheets

US 9,279,941 B1

OPTICAL WAVEGUIDE LENS

CROSS-REFERENCE TO RELATED APPLICATIONS

This application claims priority to Taiwanese patent application no. 103133183 on Sep. 25, 2014, the contents of which are incorporated by reference herein.

FIELD

The present disclosure generally relates to integrated optics, and particularly to an optical waveguide lens.

BACKGROUND

In the integrated optics field, an optical lens is usually applied to improve the optical coupling efficiency between a light source and an optical transmission device such as an optical fiber.

BRIEF DESCRIPTION OF THE DRAWINGS

Implementations of the present technology will now be described, by way of example only, with reference to the attached figures.

DETAILED DESCRIPTION

Figure 1:
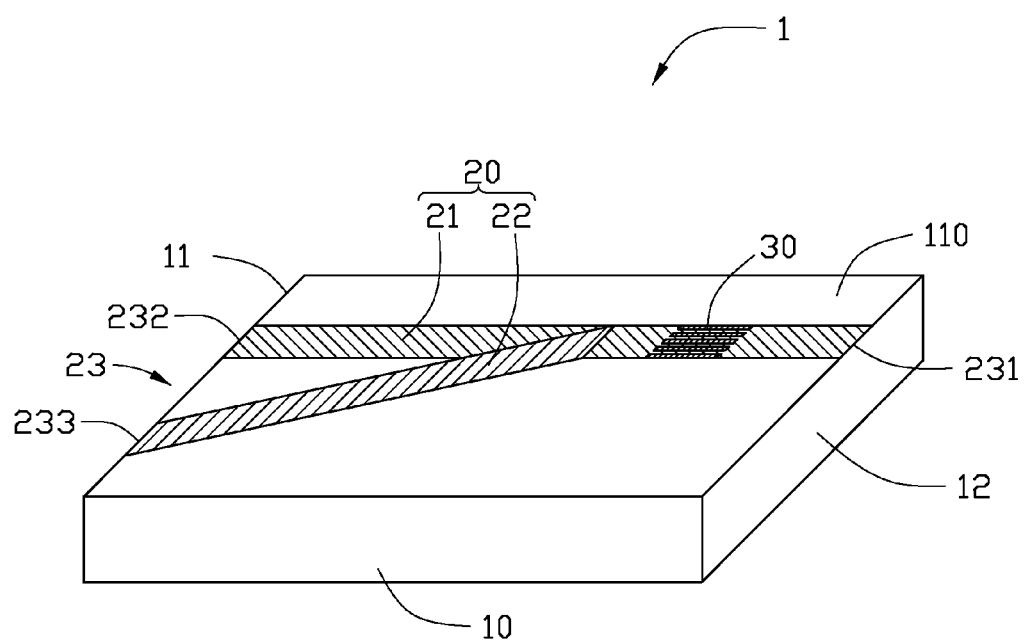
FIG. 1 is an isometric view of an optical waveguide lens in accordance with an exemplary embodiment of the present disclosure, wherein the optical waveguide lens includes a Y type waveguide and a polarized grating.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure is described in relation to an optical waveguide lens and method for manufacturing the same.

FIG. 1 illustrates that an optical waveguide lens 1 includes a base 10, a Y type waveguide 20 formed on the base 10, and a polarized grating 30 formed on the Y type waveguide 20.

The base 10 can be of rectangular parallelepiped form. The base 10 includes a top surface 110. The Y type waveguide 20 is formed on the top surface 110. The base 10 can be made of lithium niobate crystal ($LiNbO_3$). The base 10 includes a front edge 11 and an opposite rear edge 12.

The Y type waveguide 20 and the polarized grating 30 are formed on the base 10 in sequence. The Y type waveguide 20 includes a first waveguide 21 and a second waveguide 22. The first waveguide 21 and the second waveguide 22 are intersected on the first waveguide 21, thereby forming three gates 23, illustrated as a first gate 231, a second gate 232 and a third gate 233, for incident or outputting light. The first waveguide 21 and the second waveguide 22 are configured as a Y shape together. In this embodiment, the first waveguide 21 extends from the front edge 11 of the base 10 to the rear edge 12 thereof. The second waveguide 22 extends from the same front edge 11 to a middle portion of the first waveguide 21. The first gate 231 and the second gate 232 are located on two opposite sides of the first waveguide 21. The third gate 233 is located on the second waveguide 22 away from the first waveguide 21. The first gate 231 is located on the rear edge 12 of the base 10. The second gate 232 and the third gate 233 are located on the front edge 11 of the base 10.

Figure 2:
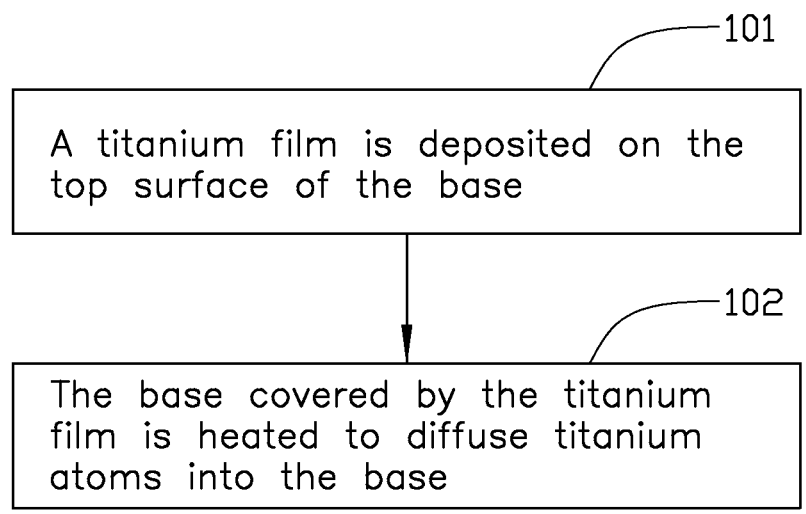
FIG. 2 is a flow chart of a method for forming a first waveguide of the Y type waveguide of the optical waveguide lens in accordance with the embodiment of the present disclosure.

Referring to FIG. 2, a flowchart is forming the first waveguide 21 of the Y type waveguide 20 in accordance with an example embodiment which is being thus illustrated. The example method 100 is provided by way of example, as there are a variety of ways to carry out the method. The method 100 described below can be carried out using the configurations illustrated in FIGS. 1 and 3, for example, and various elements of these figures are referenced in explaining example method 100. Each block shown in FIG. 2 represents one or more processes, methods or subroutines, carried out in the example method 100. Additionally, the illustrated order of blocks is by example only and the order of the blocks can change according to the present disclosure. The example method 100 can begin at block 101.

At block 101, a titanium film having a thickness of 700-900 nanometers is deposited on the top surface 110 of the base 10 by sputtering or evaporation.

At block 102, the base 10 covered by the titanium film 25 is heated in an oven at a temperature of 1020 degrees to diffuse titanium atoms into the base 10, whereby the first waveguide 21 is prepared.

Figure 3:
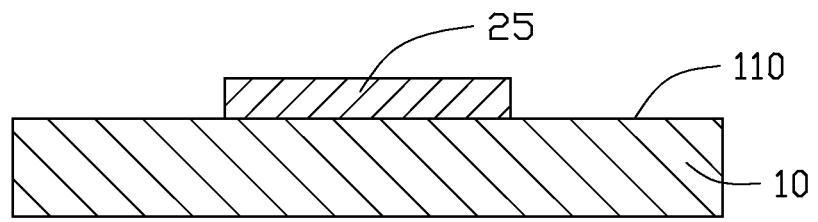
FIG. 3 is a diagram of the method for forming the first waveguide of the Y type waveguide of the optical waveguide lens in FIG. 2.
Figure 3:
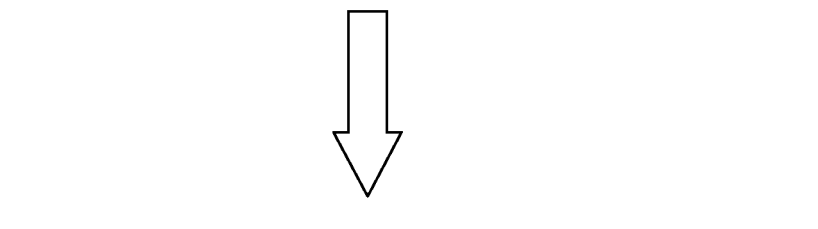
Figure 3:
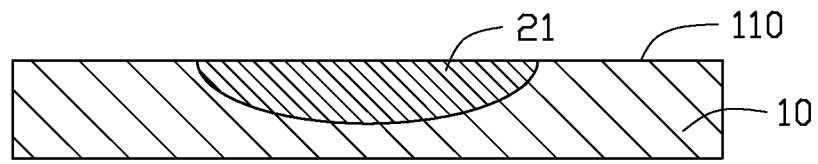

Also referring to FIG. 3, light includes a TE wave (transverse electric wave) and a TM wave (transverse magnetic wave). The TE wave and the TM wave both can travel in a material of titanium. The first waveguide 21 is a double polarized waveguide and can transmit both of the TE wave and the TM wave.

The second waveguide 22 can be fabricated in the same way as the first waveguide 21. Firstly, a nickel film is deposited on the top surface 110 of the base 10 by sputtering or evaporation. Secondly, the base 10 covered by the nickel film is heated, whereby the second waveguide 22 is prepared. The TE wave has a large attenuation when traveling in a material of nickel. The TM wave has a smaller attenuation when travels in a material of nickel than titanium. The second waveguide 22 is a single polarized waveguide and can only transmit the TM wave.

The polarized grating 30 is formed on the Y type waveguide 20 and adjacent to the first gate 231. The polarized grating 30 includes a plurality of strip-shaped films 32 arranged in parallel and spaced from each other. Each strip-shaped film 32 extends along a length direction of the first waveguide 21. The strip-shaped films 32 are arranged along a width direction of the first waveguide 21. The polarized grating 30 can only transmit single polarized waveguide, thus only TM wave will travel through the polarized grating 30.

Figure 4:
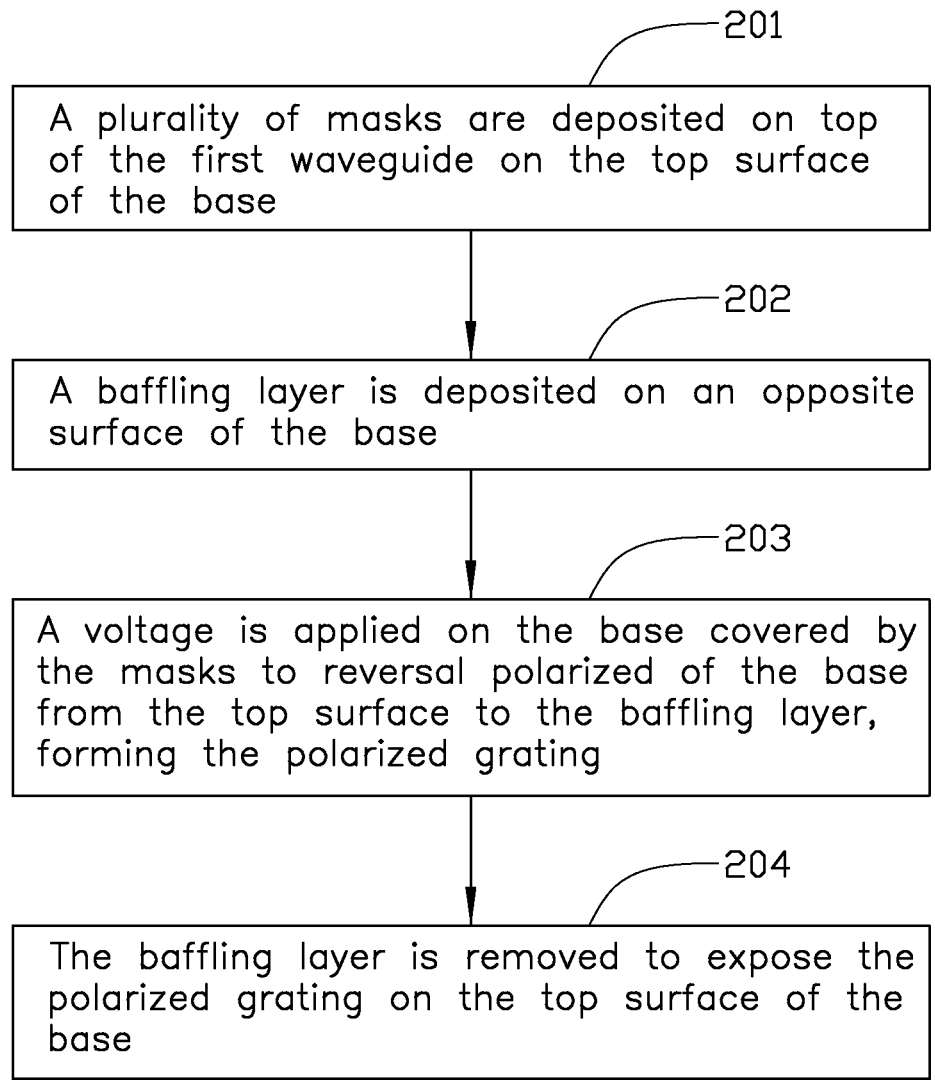
FIG. 4 is a flow chart of a method for forming the polarized grating of the optical waveguide lens in accordance with the embodiment of the present disclosure.

Referring to FIG. 4, a flowchart is the polarized grating 30 on the Y type waveguide 20 in accordance with an example embodiment which is being thus illustrated. The example method 300 is provided by way of example, as there are a variety of ways to carry out the method. The method 200 described below can be carried out using the configurations illustrated in FIG. 5, for example, and various elements of these figures are referenced in explaining example method 200. Each block shown in FIG. 4 represents one or more processes, methods or subroutines, carried out in the example method 200. Additionally, the illustrated order of blocks is by example only and the order of the blocks can change according to the present disclosure. The example method 200 can begin at block 201.

At block 201, a plurality of masks 34 are deposited on top of the first waveguide 21 on the top surface 110 of the base 10 by sputtering or evaporation.

At block 202, a baffling layer 36 is deposited on an opposite surface of the base 10.

At block 203, a voltage is applied on the base 10 covered by the masks 34 to reversal polarized of the base 10 from the top surface 110 to the baffling layer 36, thereby forming the polarized grating 30.

At block 204, the baffling layer 36 is removed to expose the polarized grating 30 on the top surface 110 of the base 10.

Figure 5:
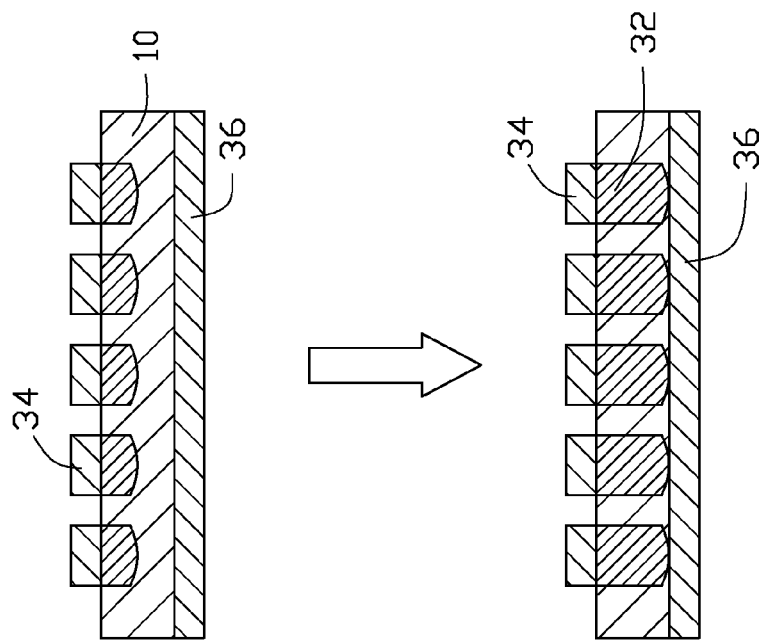
FIG. 5 is a diagram of the method for forming the polarized grating of the optical waveguide lens in FIG. 4.
Figure 5:
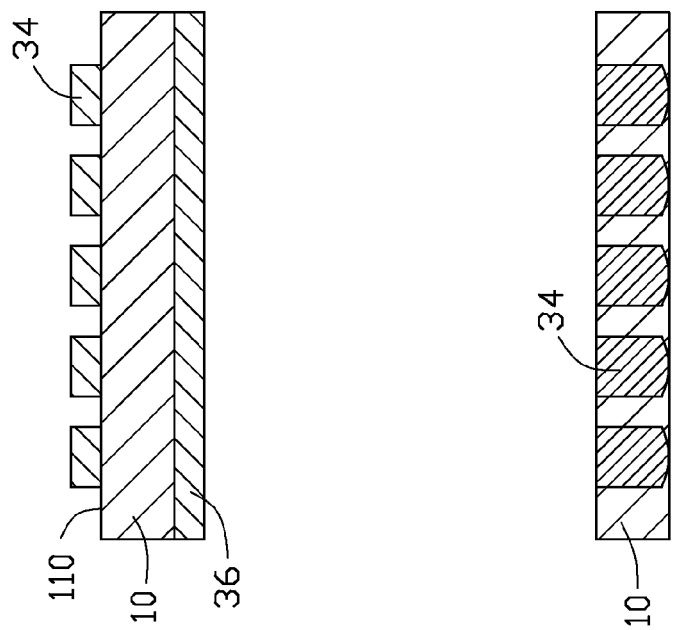

Also referring to FIG. 5, when a double polarized wave has a TE wave and a TM wave is incident to the optical waveguide lens 1 through the first gate 231, the TE wave in the double polarized wave is leached by the polarized grating 30 to obtain a single polarized wave only including the TM wave. The TM wave has a smaller attenuation when traveling in a material of nickel than titanium. Thus the TM wave travels in the second waveguide 22, then outputs through the third gate 233, thereby polarizing the double polarized wave and achieving an angle excursion thereof.

When a double polarized wave has a TE wave and a TM wave is incident to the optical waveguide lens 1 through the second gate 232, the TE wave in the double polarized wave is leached by the polarized grating 30 to obtain a single polarized wave only including the TM wave. The TM wave travels in the first waveguide 21, then outputs through the first gate 231, thereby polarizing the double polarized wave.

When a double polarized wave has a TE wave and a TM wave is incident to the optical waveguide lens 1 through the third gate 233, the TE wave in the double polarized wave is attenuated in the second waveguide 22 and is further leached by the polarized grating 30 to obtain a single polarized wave only including the TM wave. The TM wave then outputs through the first gate 231, thereby polarizing the double polarized wave and achieving an angle excursion thereof.

The double polarized wave is incident to different gates; different processes to the double polarized wave are obtained.

It is to be further understood that even though numerous characteristics and advantages have been set forth in the foregoing description of embodiments, together with details of the structures and functions of the embodiments, the disclosure is illustrative only; and that changes may be made in detail, according in matters of shape, size, and arrangement of parts within the principles of the disclosure to the full extent indicated by the broad general meaning of the terms in which the appended claims are expressed.

The embodiments shown and described above are only examples. Many details are often found in the art such as the other features of an optical waveguide lens. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An optical waveguide lens comprising:
   a base;
   a Y type waveguide formed on a top surface of the base, the Y type waveguide having a first gate, a second gate and a third gate located on edges of the base, the Y type waveguide comprising a first waveguide and a second waveguide, and the first waveguide and the second waveguide being intersected on the first waveguide; and
   a polarized grating formed on the Y type waveguide and adjacent to the first gate;
   wherein the polarized grating comprises a plurality of strip-shaped films arranged in parallel and spaced from each other; and
   wherein each strip-shaped film extends along a length direction of the first waveguide from the first gate to a joint of the first waveguide, the second waveguide and the third waveguide, and the strip-shaped films are arranged along a width direction of the first waveguide.

2. The optical waveguide lens of claim 1, wherein the first waveguide extends from a front edge of the base to an opposite rear edge, and the second waveguide extends from the front edge to a middle portion of the first waveguide.

3. The optical waveguide lens of claim 1, wherein the first gate and the second gate are located on two opposite sides of the first waveguide, and the third gate is located on the second waveguide away from the first waveguide.

4. The optical waveguide lens of claim 3, wherein the first gate is located on a rear edge of the base, and the second gate and the third gate are located on a front edge of the base.

5. The optical waveguide lens of claim 1, wherein the first waveguide is a double polarized waveguide and can transmit both of a TE wave and a TM wave, and the second waveguide is a single polarized waveguide and can only transmit the TM wave.

6. The optical waveguide lens of claim 5, wherein the first waveguide is made from titanium, and the second waveguide is made from nickel.

7. The optical waveguide lens of claim 1, wherein the polarized grating is formed on the first waveguide of the Y type waveguide.

8. The optical waveguide lens of claim 1, wherein the base is made of lithium niobate crystal.

9. The optical waveguide lens of claim 1, wherein a voltage is applied on the base covered by a plurality of masks to reversal polarized of the base, thereby forming the polarized grating.

10. An optical waveguide lens, comprising:
    a base;

a Y type waveguide with a first gate, a second gate and a third gate located on the base; the first gate being located on an edge of the base, and the second gate and the third gate being located on an opposite edge of the base, the Y type waveguide comprising a first waveguide and a second waveguide, and the first waveguide and the second waveguide being intersected on the first waveguide; and a polarized grating formed on the Y type waveguide and adjacent to the first gate;

wherein the polarized grating comprises a plurality of strip-shaped films arranged in parallel and spaced from each other; and wherein each strip-shaped film extends along a length direction of the first waveguide from the first gate to a joint of the first waveguide, the second waveguide and the third waveguide, and the strip-shaped films are arranged along a width direction of the first waveguide.

11. The optical waveguide lens of claim 10, wherein the first waveguide extends from a front edge of the base to an opposite rear edge, forming the first gate and the second gate at the front edge and the second edge, respectively, and the second waveguide extends from the front edge to a middle portion of the first waveguide, forming the third gate on the front edge.

12. The optical waveguide lens of claim 10, wherein the first waveguide is a double polarized waveguide and can transmit both of a TE wave and a TM wave, and the second waveguide is a single polarized waveguide and can only transmit the TM wave.

13. The optical waveguide lens of claim 12, wherein the first waveguide is made from titanium, and the second waveguide is made from nickel.

14. The optical waveguide lens of claim 10, wherein the polarized grating is formed on the first waveguide of the Y type waveguide.

* * * * *